(12) United States Patent
Barnor et al.

(10) Patent No.: US 10,476,989 B2
(45) Date of Patent: Nov. 12, 2019

(54) REMOTE MANAGEMENT SYSTEM FOR CINEMA EXHIBITION DEVICES

(71) Applicant: Dolby Laboratories Licensing Corporation, San Francisco, CA (US)

(72) Inventors: Henry Barnor, Emeryville, CA (US); Eric Christopher Crowe, Walnut Creek, CA (US); Thomas Turner Persons, Carmichael, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 213 days.

(21) Appl. No.: 15/481,627

(22) Filed: Apr. 7, 2017

(65) Prior Publication Data

US 2017/0295259 A1   Oct. 12, 2017

Related U.S. Application Data

(60) Provisional application No. 62/320,583, filed on Apr. 10, 2016.

(51) Int. Cl.
*G06F 15/16* (2006.01)
*H04L 29/08* (2006.01)
*H04L 29/06* (2006.01)

(52) U.S. Cl.
CPC .............. *H04L 67/34* (2013.01); *H04L 67/12* (2013.01); *H04L 67/141* (2013.01); *H04L 69/16* (2013.01)

(58) Field of Classification Search
USPC ........................................................ 709/217
See application file for complete search history.

(56) References Cited

U.S. PATENT DOCUMENTS

| | | | |
|---|---|---|---|
| 6,243,417 B1 * | 6/2001 | Obikane | H04N 21/23655 375/240.03 |
| 7,236,227 B2 | 6/2007 | Whyte | |
| 7,765,289 B2 * | 7/2010 | Park | H04L 63/02 370/352 |
| 7,936,400 B2 * | 5/2011 | Sasaki | H04N 5/32 348/584 |
| 8,395,751 B2 | 3/2013 | Redmann | |
| 8,483,393 B2 | 7/2013 | Robert | |
| 9,030,375 B2 * | 5/2015 | Curtis | G06F 3/1446 345/1.1 |
| 9,674,244 B2 * | 6/2017 | Katzman | H04N 7/15 |
| 9,680,689 B2 * | 6/2017 | Broome | H04L 29/08756 |
| 9,942,177 B1 * | 4/2018 | Ryabov | H04L 51/04 |
| 9,946,520 B1 * | 4/2018 | Houchard | H04L 67/02 |
| 2010/0011643 A1 | 1/2010 | Chadwick | |
| 2016/0119507 A1 * | 4/2016 | Duyvejonck | H04N 9/3147 348/512 |

\* cited by examiner

*Primary Examiner* — Alicia Baturay

(57) ABSTRACT

Methods and systems for management of cinema devices are disclosed. The cinema devices can connect to a central node even through a firewall. Once the initial connection is established, updates and commands can be sent and received, both to and from the cinema devices. An operator can connect to the central node to manage the cinema devices.

11 Claims, 5 Drawing Sheets

FIG. 1 [PRIOR ART]

REMOTE MANAGEMENT SYSTEM FOR CINEMA EXHIBITION DEVICES

CROSS-REFERENCE TO RELATED APPLICATION(S)

The present application claims priority to U.S. Provisional Patent Application No. 62/320,583, filed Apr. 10, 2016, which is incorporated herein by reference in its entirety. The present application also may be related to U.S. Provisional Patent Application No. 62/320,585, filed Apr. 10, 2016, the disclosure of which is incorporated herein by reference in its entirety.

TECHNICAL FIELD

The present disclosure relates to cinema devices. More particularly, it relates to a system for remote management of cinema exhibition devices.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
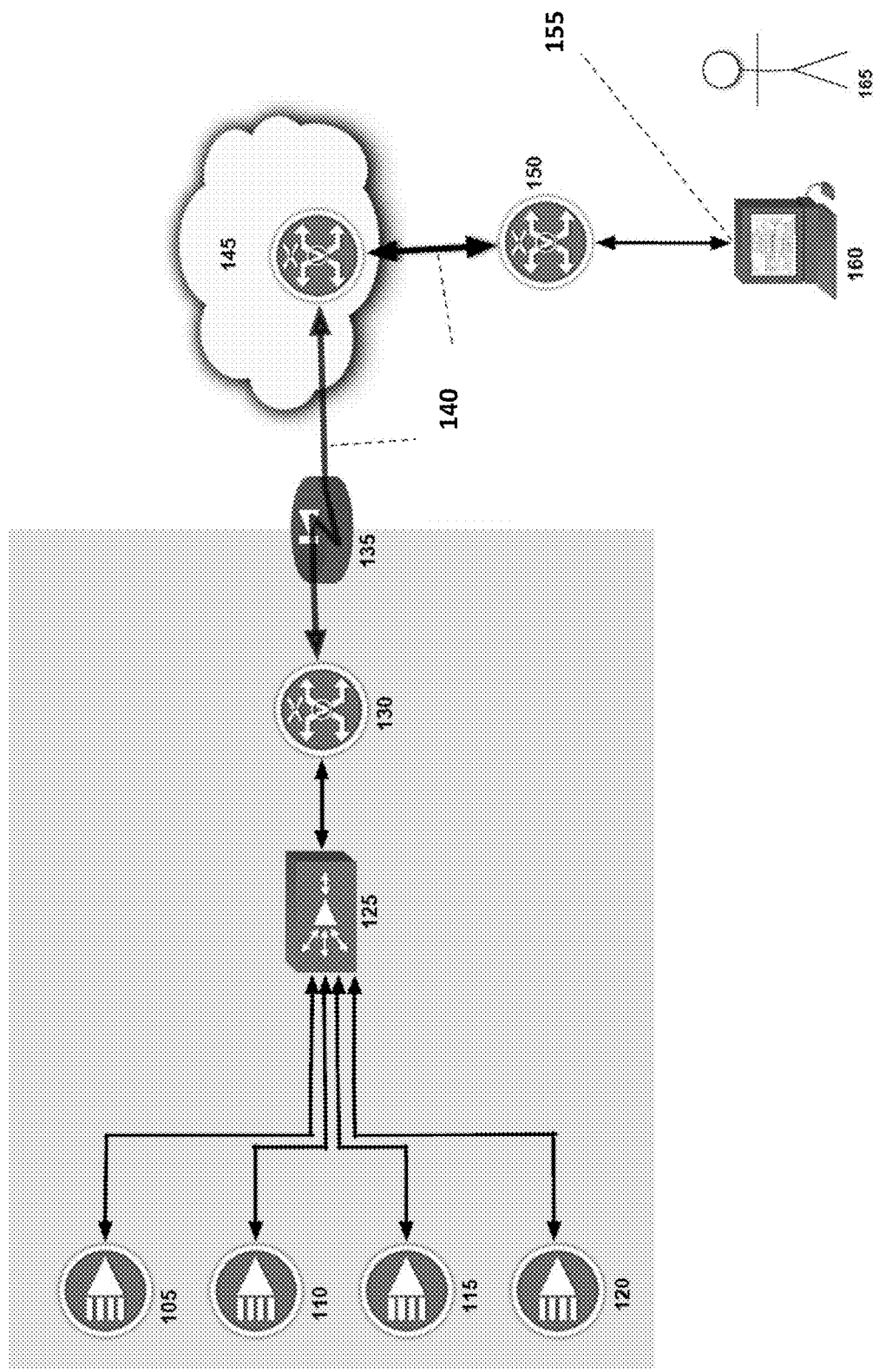
FIG. 1 illustrates a prior art approach to cinema management.

In a first aspect of the disclosure, a structure is described, the structure comprising: a plurality of cinema devices; a central node; and an operator device, wherein: the plurality of cinema devices is configured to initiate a communication with the central node and asynchronously send updates to the central node, and the operator device is configured to asynchronously send commands to the central node.

In a second aspect of the disclosure, a method is described, the method comprising: providing a plurality of cinema devices, a central node and an operator device; initiating a communication from the plurality of cinema devices to the central node; asynchronously sending updates from the plurality of cinema devices to the central node; receiving the updates on the operator device from the central node; asynchronously sending commands from the operator device to the central node; and asynchronously sending the commands from the central node to the plurality of cinema devices.

The enumeration of aspects of the disclosure is not intended to be limiting: further aspects of the disclosure can be discerned from the details herein.

DETAILED DESCRIPTION

The present disclosure describes methods to allow theater circuit owners to remotely control and monitor cinema exhibition devices without the need to create holes in their firewalls or install expensive VPN (virtual private network) communication devices. In fact, traditional methods connect to cinema devices through a firewall and a VPN network.

More specifically, the present disclosure describes how cinema exhibition devices establish outgoing persistent network connections to a central network location (central node). The central node can have different implementations. For example, the central node could be a server that accepts connections from the cinema devices. The devices could connect to the server via broadband, such as a fiber optic or DSL connection. Once the connection between the cinema devices and the central node is established, the devices use that connection to asynchronously send events that represent their current state. For example, one cinema device might have a change in status. For example, the status could be whether the device is displaying a video or not. The device may send its status information to the central node, without the central node specifically requesting that information. For example, the status could be sent periodically at defined intervals, or it could be sent only when the status has changed, for example from an active display to an inactive display. The central node also uses the same single connection to asynchronously send control events to the cinema exhibition device. The control events can be commands to the cinema devices. For example a command to activate a display or deactivate a display, or play a certain media content. Both ends of the connection use a lightweight protocol that minimizes bandwidth usage.

In some embodiments, all the cinema devices belong to a circuit and connect to the central node. Examples of cinema devices include cinema servers, cinema processors, amplifiers, projectors, and other cinema exhibition devices. After an initial handshake to establish a session, each device can begin to periodically send state information.

For a cinema server, state information could include the state of its transport, the clips and licenses on the cinema server, the show schedule, etc. The cinema server could also send the detailed state of its hardware including information such as the health of the hard drives on the system. Additionally, any problems on the system could also be sent to the central node. The central node can, at any time, send commands to the cinema server, for example to change its transport state, select a new show, create a new show in a schedule, load new licenses or load new content onto the cinema server.

For a cinema processor, state information could include the current macro, the format of the audio bitstream, the fader level, mute status, and current speaker configuration (for example, for Dolby Atmos™ speakers). The cinema processor could also send the detailed state of its hardware, for example the temperature of the system and fan rpm (revolutions per minute) values. The central node can similarly send commands to change the fader level, the macro being used, or send a new speaker configuration file.

Current methods for monitoring and controlling cinema exhibition devices require an onsite device that collects and aggregates data from the cinema exhibition devices. The approach of the present disclosure allows for individual devices to send their own data in a bandwidth efficient way. The approach of the present disclosure eliminates the bottle neck and single-source-of-failure problem that existing approaches can have. In addition, the approach of the present disclosure gives better data resolution since each cinema exhibition device can send more detailed information about its internal state.

The present disclosure also eliminates the need for cinema operators to modify their firewalls and/or install VPN technology since the method of the present disclosure has the cinema devices initiate the outgoing connection.

The method of the present disclosure can use a bandwidth efficient, light-weight protocol over a single outgoing network connection to provide asynchronous bi-directional communication between exhibition devices and a central control node.

The protocol can use TCP/ZMQ as the transport protocol with a higher level messaging protocol. TCP stands for transmission control protocol while ZMQ stands for ZeroMQ™ a high-performance asynchronous messaging library, aimed at use in distributed or concurrent applications. In some embodiments, the transport protocol is encrypted.

FIG. 1 illustrates a prior art approach to cinema management. Examples of cinema devices to be connected are a cinema server (105), a cinema processor (110), a projector (115), and an audio amplifier (120). These devices connect to an onsite aggregator (125), a VPN client (130), a firewall (135) and a VPN termination node (145) through a VPN connection (140). An operator device (160) connects to a VPN client (150) and the VPN termination node (145) through a VPN connection (140). The operator (165) is located (155) at the operator device (160), which can also be co-located at the VPN termination point (145). For example, the cinema devices can be located at a theater.

Figure 2:
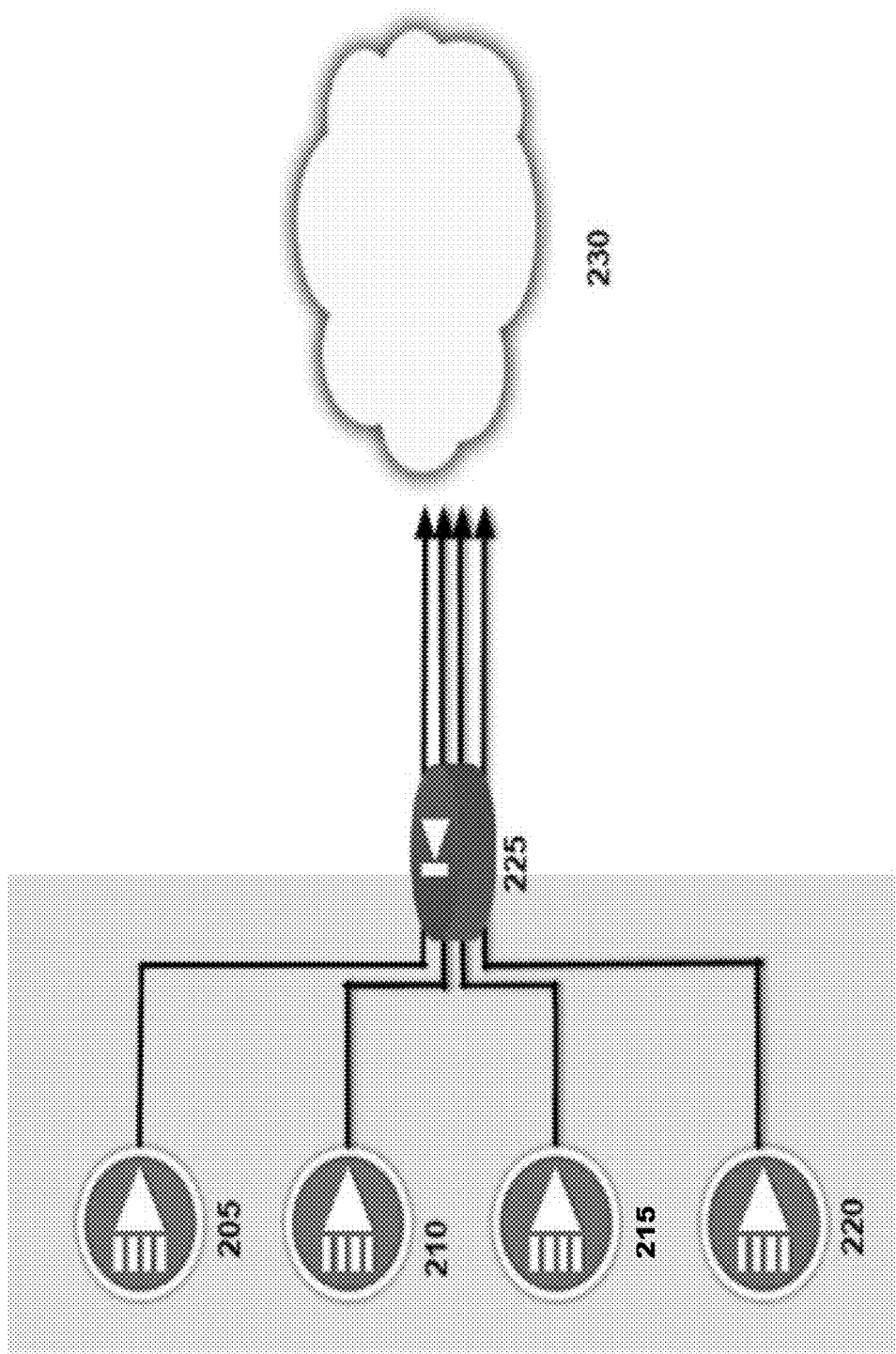
FIG. 2 illustrates an example of how, in the method of the present disclosure, the cinema devices connect directly to a central node.

FIG. 2 illustrates how, in the method of the present disclosure, the cinema devices connect directly to a central node. For example, the cinema devices may comprise a cinema server (205), a cinema processor (210), a projector (215), and an amplifier (220). The cinema devices connect to a central node (230) through a firewall (225). It can be noted, comparing FIG. 1 to FIG. 2, that the connection initiation of the cinema devices is simplified in FIG. 2 compared to FIG. 1.

Figure 3:
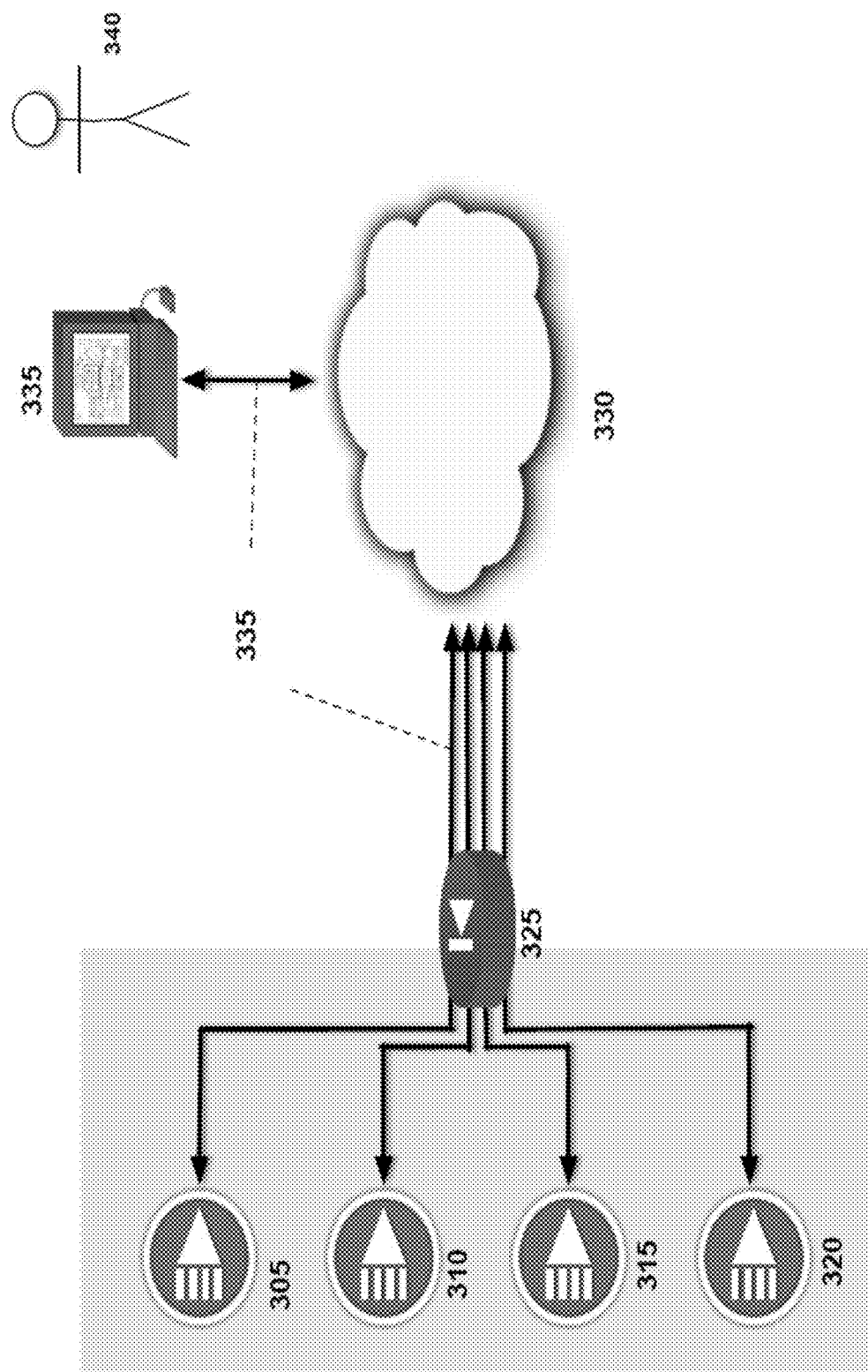
FIG. 3 illustrates an example expanded topology for connections between cinema devices, the central node, and an operator device.

FIG. 3 illustrates an expanded topology for the connections between cinema devices and the central node and operator. The cinema server (305), cinema processor (310), projector (315), and amplifier (320) connect to the central node (330) through the firewall (325). The operator device (335), operated by the operator (340), also connects to the central node (330). The connections (335) to the central node (330) are regular network connections, and do not require VPN connections as in FIG. 1. The operator is able to monitor and control individual cinema devices. Once the cinema devices establish the communication link to the central node, bi-directional asynchronous communication between the cinema devices and the central node can take place.

Figure 4:
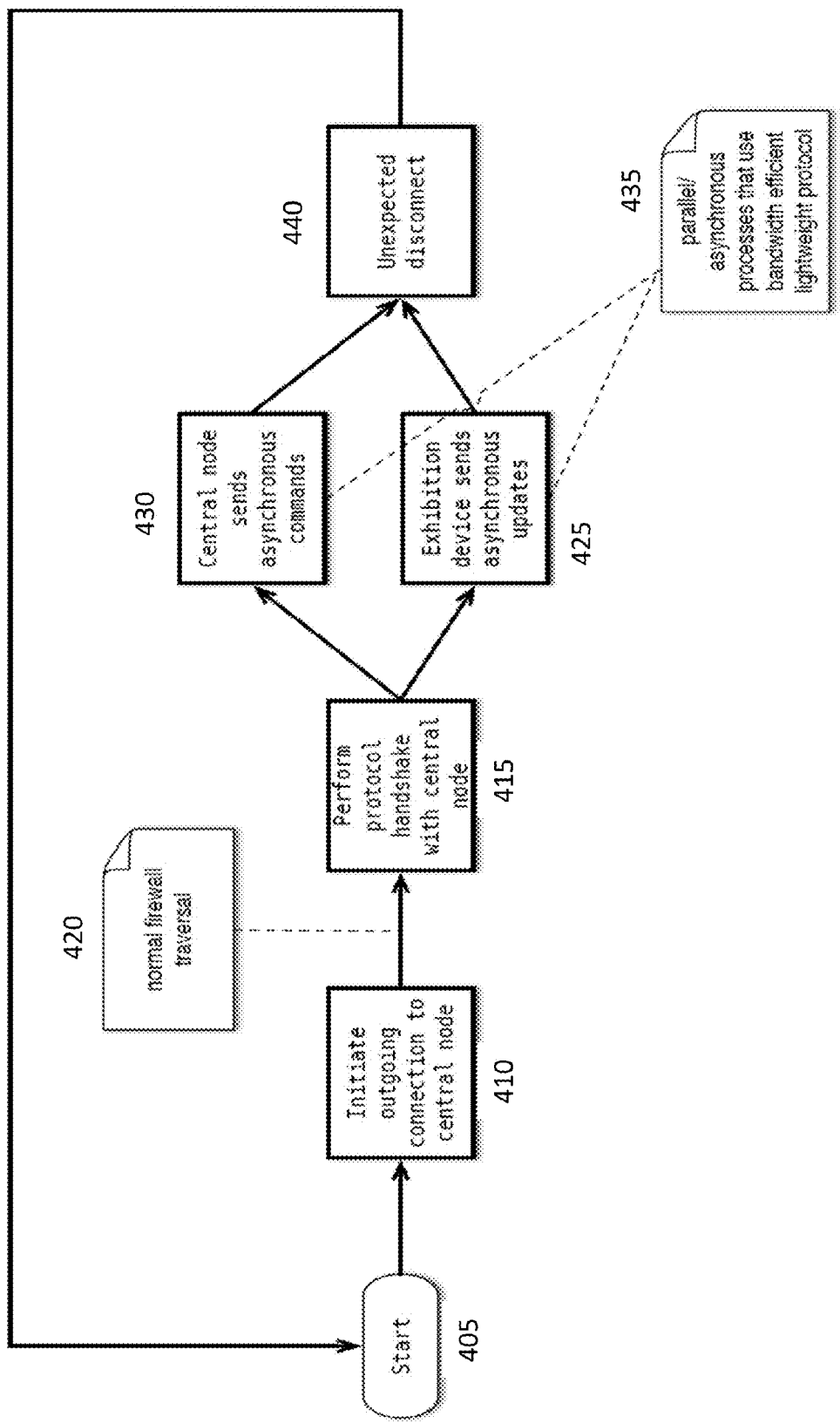
FIG. 4 illustrates an exemplary flowchart for the method of the present disclosure.

FIG. 4 illustrates an exemplary flowchart for the cinema exhibition devices. To begin the connection protocol (405), the cinema devices initiate an outgoing connection towards the central node (410) and then a protocol handshake is performed with the central node (415) through a firewall (420). Once the communication between the cinema devices is established, the exhibition devices can send asynchronous updates to the central node (425), and the central node can send asynchronous commands to the cinema devices (430). If an unexpected disconnect happen (440), the algorithm can restart (405) by initiating a new connection with a new handshake. The asynchronous or parallel commands and updates (425,430) can use a bandwidth efficient lightweight protocol (435).

Figure 5:
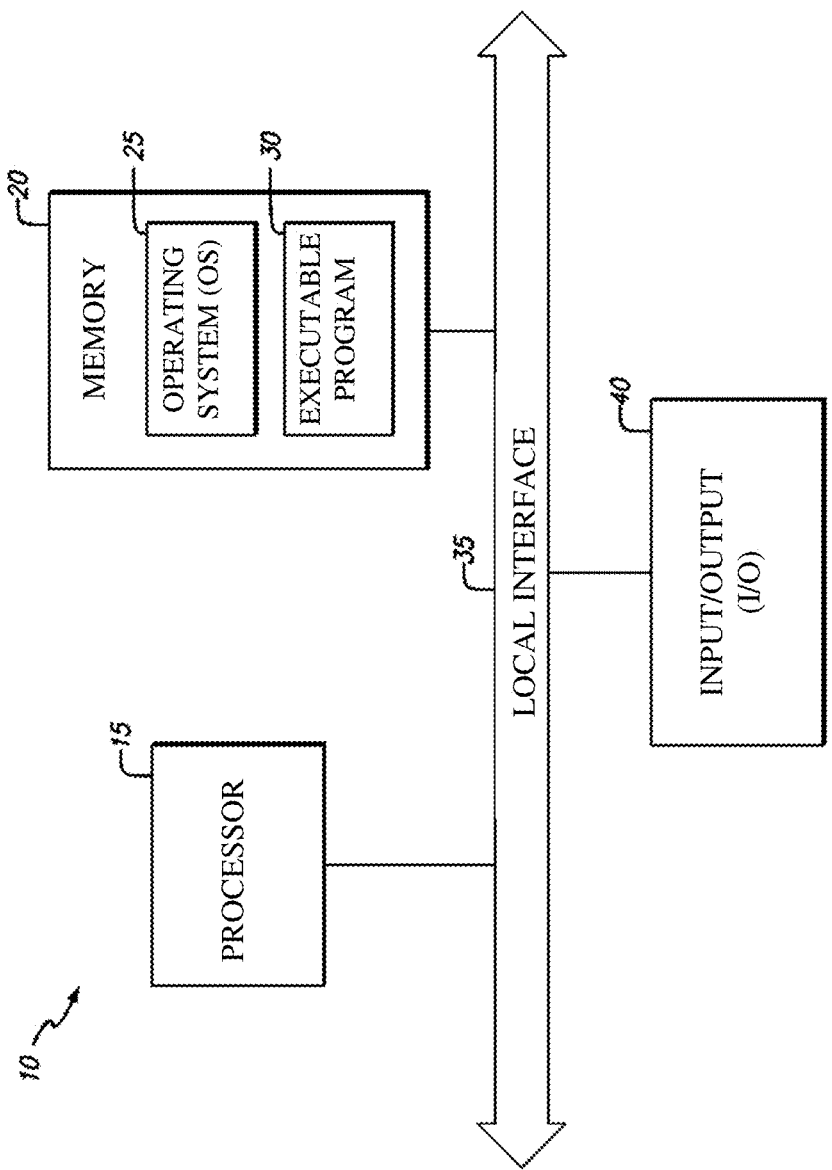
FIG. 5 depicts an exemplary embodiment of hardware for implementation of an embodiment of the present disclosure.

FIG. 5 is an exemplary embodiment of a target hardware (10) (e.g., a computer system) for implementing the embodiments of FIGS. 2-4. This target hardware comprises a processor (15), a memory bank (20), a local interface bus (35) and one or more Input/Output devices (40). The processor may execute one or more instructions related to the implementation of FIGS. 2-4, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 5. In some embodiments a plurality of processors may be used in a parallel configuration for added execution speed. In such a case, the executable program may be specifically tailored to a parallel execution. Also, in some embodiments the processor (15) may execute part of the implementation of FIGS. 2-4, and some other part may be implemented using dedicated hardware/firmware placed at an Input/Output location accessible by the target hardware (10) via local interface (35). The target hardware (10) may include a plurality of executable programs (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A method comprising:
   providing a plurality of cinema devices, a central node, and an operator device;
   initiating a communication from the plurality of cinema devices to the central node;
   asynchronously sending updates from the plurality of cinema devices to the central node;
   receiving the updates on the operator device from the central node;
   asynchronously sending commands from the operator device to the central node; and
   asynchronously sending the commands from the central node to the plurality of cinema devices,
   wherein the plurality of cinema devices comprises a cinema processor, and the asynchronously sending updates comprises sending, from the cinema processor, a current macro, a format of an audio bitstream, a fader level, a mute status, a speaker configuration, and a state of a hardware of the cinema processor.

2. The method of claim 1 wherein initiating a communication is by a handshake protocol.

3. The method of claim 1, wherein asynchronously sending comprises sending updates at a different time as, and independently from, sending commands.

4. The method of claim 1, wherein the plurality of cinema devices further comprises a cinema server, a projector, and an amplifier.

5. The method of claim 1, wherein asynchronously sending updates and commands from and to the plurality of cinema devices is through a firewall.

6. The method of claim 1, wherein asynchronously sending updates and commands is with a bandwidth-efficient lightweight communication protocol.

7. The method of claim 6, wherein the bandwidth-efficient lightweight communication protocol is a TCP/ZMQ protocol.

8. The method of claim 1, wherein the plurality of cinema devices further comprises a cinema server, and asynchronously sending updates comprises sending, from the cinema server, a transport state, clips and licenses on the cinema server, a show schedule, and a state of a hardware of the cinema server.

9. The method of claim 8, wherein asynchronously sending the commands from the central node comprises changing the transport state, selecting a new show for display, creating a new show on a schedule, loading new licenses onto the cinema server, and loading new content onto the cinema server.

10. The method of claim 1, wherein asynchronously sending the commands from the central node comprises changing a fader level for the cinema processor, a macro for the cinema processor, and a new configuration file for the cinema processor.

11. A method comprising:
    providing a plurality of cinema devices, a central node, and an operator device;
    initiating a communication from the plurality of cinema devices to the central node;
    asynchronously sending updates from the plurality of cinema devices to the central node;
    receiving the updates on the operator device from the central node;
    asynchronously sending commands from the operator device to the central node; and
    asynchronously sending the commands from the central node to the plurality of cinema devices,
    wherein the plurality of cinema devices comprises a cinema processor, and the asynchronously sending updates comprises sending, from the cinema processor, at least one of: a current macro, a format of an audio bitstream, a fader level, a mute status, a speaker configuration, and a state of a hardware of the cinema processor.

* * * * *